Figure 1:
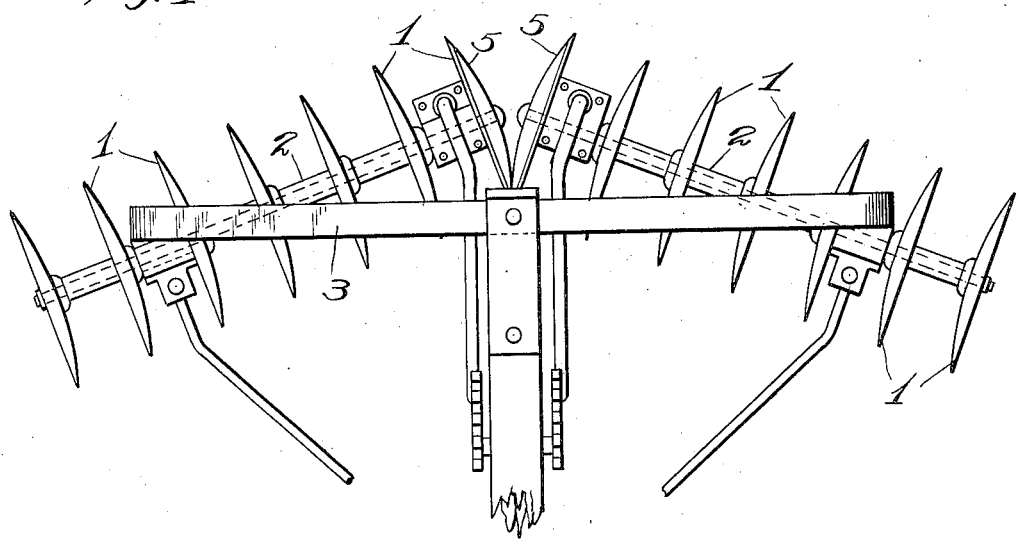

W. S. NICHOLS.
DISK HARROW.
APPLICATION FILED JULY 14, 1913.

1,092,284.

Patented Apr. 7, 1914.

Witnesses:

Inventor
Winfield Scott Nichols.

Lucy D. Stone by Burton & Burton
his Att'ys.

UNITED STATES PATENT OFFICE.

WINFIELD SCOTT NICHOLS, OF PLANO, ILLINOIS, ASSIGNOR TO INDEPENDENT HARVESTER COMPANY, OF PLANO, ILLINOIS, A CORPORATION OF ILLINOIS.

DISK HARROW.

1,092,284.  Specification of Letters Patent.  Patented Apr. 7, 1914.

Application filed July 14, 1913.  Serial No. 778,830.

*To all whom it may concern:*

Be it known that I, WINFIELD SCOTT NICHOLS, a citizen of the United States, residing at Plano, in the county of Kendall and State of Illinois, have invented new and useful Improvements in Disk Harrows, of which the following is a specification, reference being had to the accompanying drawings, forming a part thereof.

The purpose of this invention is to provide an improved construction for disk harrows to remedy a certain defect in such harrows as heretofore constructed. It consists of the features and elements described and shown in the drawings as indicated in the claims.

Figure 2:
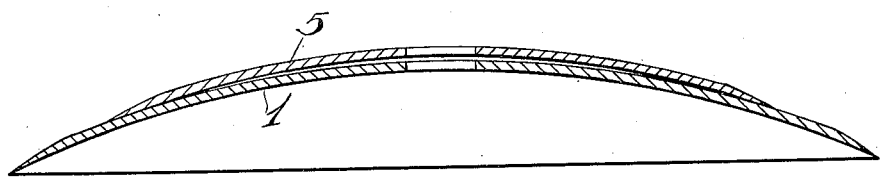

In the drawings:—Figure 1 is a plan view of a part of a disk harrow embodying this invention. Fig. 2 is a detail axial section of one of the disks equipped with the features constituting this invention.

The drawings show in a general way the ordinary construction and organization of a disk harrow comprising two gangs of harrow disks, 1, mounted on two shafts, 2, which are mounted in the usual manner on the frame, 3, with capacity of adjustment to vary the angle at which they diverge from perfect alinement to each other in operation. In the common construction of these implements bumpers are provided at the proximate ends of the shafts of the two gangs of disks which bear against each other in the operative positions of the two gangs, and upon which in a manner the two gangs fulcrum against each other in changes of angle. In such construction it will be seen that the operating peripheries of the proximate disks of the two gangs which may be close together when the gangs are adjusted most divergent from alinement will be spread apart more and more as the gangs are adjusted toward a position at which the shafts are alined. In some of these common forms the bumper is made so as to extend for a considerable distance out toward the working periphery of the disk on which it is mounted, in which case the two bumpers roll upon each other,—their point of contact shifting from the center out toward the circumference,—as the gangs are adjusted from alinement to the position of their greatest divergence from alinement, but in this form also it results that the working peripheries of the proximate harrow disks are moved farther and farther apart as the shafts approach alinement. This separation of the harrow disks is objectionable because it operates to leave between them a ridge of earth which is untouched by the harrow. Obviously, the minimum spread or separation of the peripheries of these disks will result from their change of adjustment toward alinement of the shafts if the disks bear directly upon each other in all operative positions, in such case the separation at their working peripheries would be so slight as to be negligible; but, by the omission of the bumper or heavy reinforce of that character whereby the two disks are allowed to come directly into contact, I have found that the effect of their rubbing upon each other is to rapidly crystallize both of them at the circumference of the retaining nut or bolt-head by which they are bound at the center on the shaft, causing them to break at that point after a short period of use, several replacements being thus rendered necessary in a single season's use.

I avoid both the difficulty of the common construction consisting in the spreading apart of the operating peripheries of the disks when the gangs are adjusted toward alinement of their shafts, and also the destructive crystallization of the disks themselves as above explained, by the feature which constitutes the present invention. This feature consists in a thin spring metal,—preferably steel,—concavo-convex disk, 5, whose thickness may be even less than that of the harrow disks, and which can be readily made by stamping from sheet steel, its curvature on the concave side, which is mounted toward the convex side of the harrow disk being slightly greater than that of said convex side, so that when it is bound on to the shaft by the nut or bolt-head which would ordinarily be employed to bind the harrow disk thereon, and when the same is tightened up so as to press the periphery of said disk, 5, snugly against the convex outer surface of the harrow disk, the said disk, 5, is sprung or put under tension between its periphery where it bears upon the harrow disk and the center area where it is bound by the bolt-head or nut, and thereby is caused to operate somewhat as a bow spring to absorb the vibration which would otherwise be experienced and which it is the intention of the invention to prevent being communicated to the harrow disk. When the reinforce disk, 5, is thus tightened up against the harrow disk, there may remain a little space between the proximate surfaces of the two disks over the entire area within the mere margin which bears on the outer surface of the harrow disk, or the two disks may be forced into actual contact immediately back of the central binding head or nut and for some distance outward therefrom. But even in such case, it is judged to be probable that there is an area intermediate the circumferential bearing of the reinforce disk upon the other disk and the central area mentioned over which intermediate annular area the two disks are out of contact. But whether this be the fact or not, and at all events, according to actual experience, whether or not the two disks are out of contact about the center, the construction described results in preventing deleterious vibration of either of the disks, thereby preventing the breaking out of the center, which happens, as above described, when the two harrow disks without reinforcement are allowed to roll directly upon each other. A further purpose of constructing the reinforce disk so that when first positioned on the convex surface of the harrow disk and before pressure is applied at the center to bind it in place, the circumferential edge only is in contact, is to insure thorough contact at that edge when the pressure is applied to the center to bind it securely. The said disk, 5, is ground upon its outer convex surface at the periphery to a knife edge, so that it is at this knife edge that it bears laterally upon the convex surface of the harrow disk; and when thus tightened in place, the entrance of dirt between the two disks is prevented.

I claim:—

In a disk harrow comprising two gangs of disks, the shafts on which they are respectively mounted, the frame which carries the shafts and the means for adjusting the shafts toward and from alinement with each other, reinforces mounted on the convex side of the proximate disks of the two gangs, said reinforces consisting each of a thin concavo-convex spring metal disk, the curvature of whose concave side toward the harrow disk on which it is mounted is normally slightly greater than that of the convex side of said harrow disk, and means for clamping such reinforce against said convex side of the harrow disk to cause its periphery to seat snugly before contact is produced about the center.

In testimony whereof, I have hereunto set my hand at Chicago, Illinois, this 3d day of July, 1913.

WINFIELD SCOTT NICHOLS.

Witnesses:
LUCY I. STONE,
M. GERTRUDE ADY.

Copies of this patent may be obtained for five cents each, by addressing the "Commissioner of Patents, Washington, D. C."